April 20, 1965
O. W. McGINTY
3,179,920
FLUID LEVEL INDICATOR FOR RADIATOR
Filed Aug. 14, 1963
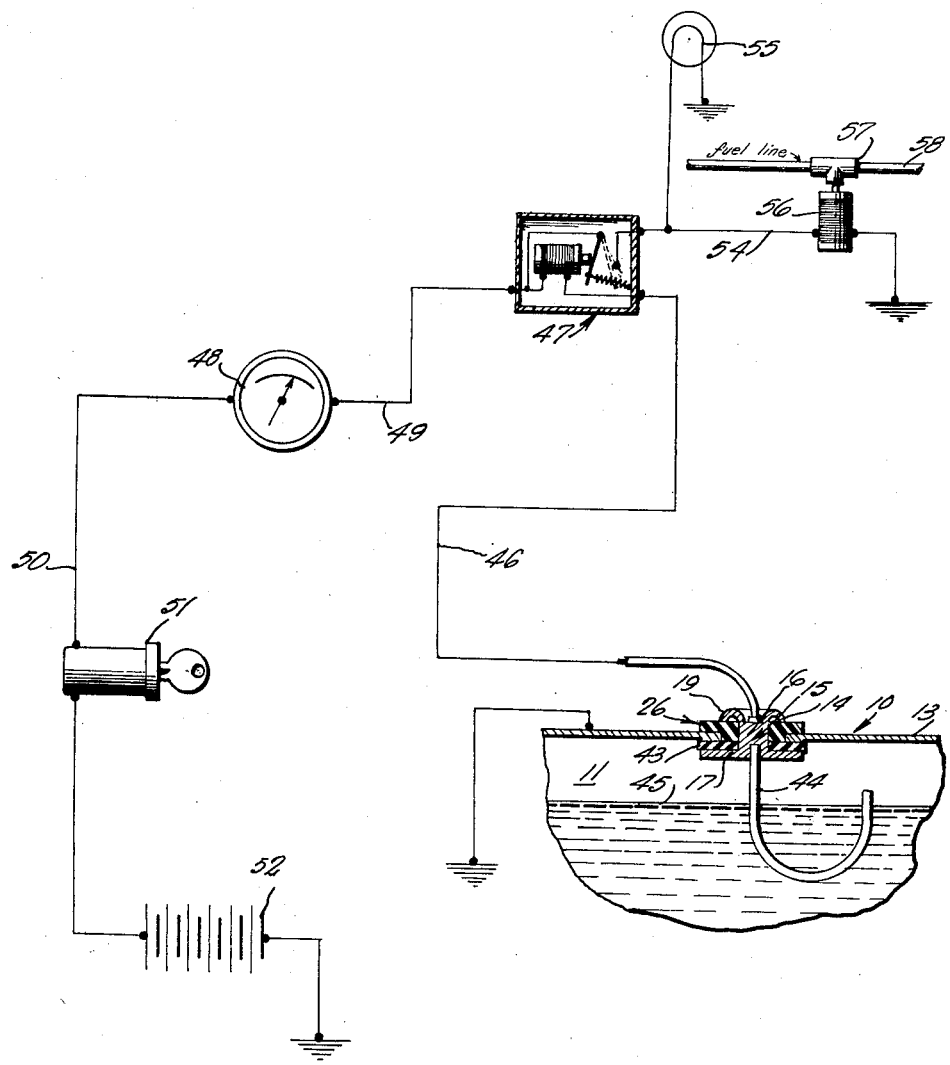
INVENTOR.
Otto Wayne McGinty

3,179,920
FLUID LEVEL INDICATOR FOR RADIATOR
Otto Wayne McGinty, Box 1471, Ponca City, Okla.
Substituted for abandoned application Ser. No. 727,156, Apr. 8, 1958. This application Aug. 14, 1963, Ser. No. 303,957
1 Claim. (Cl. 340—59)

This invention relates to a motor or engine cooling system, and more particularly to a means for indicating the level of cooling fluid in a radiator or engine expansion tank. This application is a substitute for Serial No. 727,156, filed April 8, 1958, now abandoned.

The object of the invention is to provide a means whereby the driver of a vehicle will be able to readily ascertain the level of cooling fluid in a radiator or expansion tank.

Another object of the invention is to provide an indicating means for use with a vehicle cooling system, so that in the event that the cooling fluid such as water or anti-freeze drops below a predetermined level, a meter or signal light will be actuated, and whereby with such a meter or signal light positioned at a convenient location such as adjacent to the vehicle dashboard, the driver or occupant of the vehicle will be able to readily ascertain or be advised that the level of cooling fluid has varied from the normal or safe level so that necessary corrective measures can be taken in order to prevent damage to the vehicle cooling system.

A further object of the invention is to provide a cooling system indicating means which is extremely simple and inexpensive to manufacture, and which is operated from a storage battery.

Other objects and advantages will be apparent during the course of the following description.

In the accompanying drawings, forming a part of this application, and in which like numerals are used to designate like parts throughout the same:

The figure is a fragmentary elevational view illustrating one form of the cooling system indicator.

In the figure of the drawings, there is illustrated an embodiment wherein an electrode 44 depends from the body member 15 and is immersed in the cooling fluid 45 which is arranged in the chamber of the radiator. An insulated plate 43 is arranged between the base 17 and wall 13. The numeral 46 indicates a wire which is connected to the body member 15, and the wire 46 leads to a relay 47, and the relay 47 is electrically connected to a meter 48 by means of a wire 49. A wire 50 is used for connecting the usual vehicle ignition switch 51 to the meter 48, and the numeral 52 indicates a source of electrical energy such as the vehicle battery. A pilot light 53 may be provided for giving the driver of the vehicle a visual indication when the level of fluid 45 varies from normal level. The relay 47 may also have a wire 54 connected thereto, and a pilot light 55 may be connected to the wire 54, and the wire 54 may be connected to a solenoid 56 which is used for actuating a valve 57 that is arranged in a fuel line 58. Thus, when the level of fluid 45 varies from normal, the resistance of the electrode 44 will change so that the relay 47 can be used for actuating the meter 48 and light 53. Furthermore, this relay 47 can be used for actuating the solenoid 56 so as to close the valve 57 so that no further fuel can flow through the line 58 whereby the vehicle cannot be operated so that damage to the cooling system or other parts of the engine will be prevented.

When the level of fluid or water 45 is below the electrode 44, the electrical circuit will be broken or interrupted, but when the water is sufficiently high to cover a portion of the electrode 44, the electrical circuit is completed. With the circuit completed, when the ignition switch 51 is turned on, the relay 47 will be energized, and it is to be noted that the relay 47 is of conventional construction. As the relay 47 is energized, it breaks the circuit to the solenoid 56 and this permits the valve 57 to allow fuel to flow through the line 58.

When the water level drops below the electrode 44, the circuit is broken, and the relay 47 is not now energized. Therefore, when the ignition switch 51 is turned on, the electrical current will bypass the relay 47, and the electrical current or energy will energize the solenoid 56 so as to shut off the fuel flowing through the line 58 whereby the vehicle will not operate.

From the foregoing, it is apparent that there has been provided an indicating mechanism for use with a vehicle cooling system whereby a person will be able to readily ascertain the level of fluid in the radiator without the necessity of removing the radiator cap, and wherein when the level of fluid varies from its normal position, a meter on the dashboard of the vehicle or a light on the dashboard will be actuated so that a person will be able to readily observe the fluid level in the radiator without the necessity of lifting the hood and removing the cap from the radiator.

In the embodiment shown by the drawing, the electrode 44 is constructed of such a material that as the level of fluid 45 varies, the amount of resistance on the electrode 44 varies, and this changing electrical resistance on the electrode 44 can be used to actuate the relay 47. This relay 47 in turn can be used for energizing a meter 48 and a bulb 55 which may be arranged on the dashboard of the vehicle, and with the meter 48 properly calibrated, the driver of the vehicle can readily observe the level of liquid in the chamber 11. Furthermore, the relay 47 can actuate a solenoid 56 which can be used for closing a valve 57 in the fuel line 58 so that the vehicle cannot be driven when the cooling fluid level is too low and this will be a further safety measure since the vehicle cannot be driven to damage the cooling system until the cooling fluid level is again brought up to the proper position or level.

With the present invention, a person will be able to immediately determine when the ignition switch is turned on, whether there is sufficient cooling fluid in the engine system. Thus, the cooling system can be kept in good condition to cool an engine under all operating conditions. An advantage of the electrode such as the electrode 44 over the movable float such as the float 35 or 40, is that the electrode 44 does not utilize any moving parts so that there will be less likelihood of the parts getting out of order.

It is to be noted that the present invention is applicable to a motor or engine or engine expansion tank as some systems use an expansion tank where pressure caps are not used, and it is to be understood that the word "engine" covers an engine of a vehicle as well as a stationary engine.

The electrode 44 depends on fluid level for its operation, and as the fluid level varies from normal to low, the resistance will vary in the circuit. The resistance will vary in the circuit at normal fluid level for a period of time depending upon the type of fluid used, and different types of anti-freeze mixed with distilled water have their own particular effect on the reading, the salt ions being neutralized with electrical energy.

It is necessary that in connection with the electrode such as 44, that electrolysis be used to carry out the function of the present invention to the extent that electrolysis will increase the efficiency of the operation as well as help protect the engine or cooling system. However, electrolysis does not enter into the function for protecting the engine or cooling system when only a positive or negative electrode is used for obtaining the information.

Minor changes in shape, size and rearrangement of details coming within the field of invention claimed may be resorted to in actual practice, if desired.

What is claimed is:

In a cooling system, a radiator provided with a chamber for holding a quantity of coolant, said radiator including a top wall provided with an opening therein, a body member of conductive material having a first portion projecting through said opening, said body member including a lower horizontally disposed base and an upper flange, said base being of greater diameter than the opening in said top wall, said flange being of a diameter that is greater than the diameter of the first portion of said body member, a top piece of insulated material including a first section surrounding said first portion, said top piece further including a second section arranged above the top wall of the radiator, a condition sensing electrode depending from said body member and extending into said chamber, an insulated plate arranged above said base and positioned below said top wall, the first portion of said body member projecting through the center of said insulated plate, a first electrical circuit including a wire connected to said body member in series with a source of electrical energy, an ignition switch, a meter and a relay, said relay having switch means in a second circuit including a pilot light and a solenoid fuel valve operating means, said relay being responsive to a predetermined energization of said first electrical circuit resulting from a condition sensed by said electrode to operate said switch means and connect said pilot light and solenoid fuel valve operating means to said source of electrical energy.

References Cited in the file of this patent

UNITED STATES PATENTS

| | | |
|---|---|---|
| 1,604,210 | West | Oct. 26, 1926 |
| 1,751,016 | O'Neill | Mar. 18, 1930 |
| 2,453,236 | Lazarus | Nov. 9, 1948 |
| 2,618,248 | Lindberg et al. | Nov. 18, 1952 |
| 2,625,595 | Boddy | Jan. 13, 1953 |
| 2,661,411 | Berger | Dec. 1, 1953 |
| 2,700,153 | Huckabee | Jan. 18, 1955 |
| 2,877,318 | Culley | Mar. 10, 1959 |

FOREIGN PATENTS

| | | |
|---|---|---|
| 118,407 | Australia | Apr. 17, 1941 |
| 622,882 | Great Britain | Nov. 9, 1949 |